United States Patent [19]
Connelly et al.

[11] Patent Number: 6,012,485
[45] Date of Patent: Jan. 11, 2000

[54] FLUID FILTER ARRANGEMENT INCLUDING VALVE ARRANGEMENT, FLUID LEVEL INDICATOR, AND METHODS THEREOF

[75] Inventors: John F. Connelly, Chanhassen; Brent A. Gulsvig, Faribault; Mark G. Soderlund, Lakeville; Jeff J. Theisen, Prior Lake, all of Minn.

[73] Assignee: Donaldson Company, Inc., Minneapolis, Minn.

[21] Appl. No.: 09/153,548

[22] Filed: Sep. 15, 1998

Related U.S. Application Data

[62] Division of application No. 08/914,626, Aug. 19, 1997.

[51] Int. Cl.[7] .................................................. F16K 37/00
[52] U.S. Cl. ......................... 137/558; 137/549; 137/559; 251/345
[58] Field of Search ..................... 137/549, 559, 137/558; 251/345, 341

[56] References Cited

U.S. PATENT DOCUMENTS

| | | | |
|---|---|---|---|
| 832,038 | 10/1906 | Carlsson | 137/549 |
| 2,889,852 | 6/1959 | Dunlap . | |
| 3,067,880 | 9/1962 | Bowers et al. . | |
| 3,297,162 | 1/1967 | Mouwen . | |
| 3,370,468 | 2/1968 | Healy . | |
| 3,529,722 | 9/1970 | Humbert, Jr. . | |
| 3,822,787 | 7/1974 | Shaltis et al. . | |
| 3,850,198 | 11/1974 | Braukmann | 251/341 |
| 4,053,409 | 10/1977 | Kuhfuss, Jr. . | |
| 4,222,875 | 9/1980 | Sikula, Jr. . | |
| 4,364,825 | 12/1982 | Connor, Jr. . | |
| 4,369,113 | 1/1983 | Stifelman . | |
| 4,428,834 | 1/1984 | McBroom et al. . | |
| 4,446,019 | 5/1984 | Robinson . | |
| 4,480,160 | 10/1984 | Stifelman . | |
| 4,512,882 | 4/1985 | Fischer et al. . | |
| 4,522,712 | 6/1985 | Fischer et al. . | |
| 4,611,627 | 9/1986 | Eidsvoog et al. . | |
| 4,615,800 | 10/1986 | Stifelman et al. . | |
| 4,743,374 | 5/1988 | Stifelman . | |
| 4,753,266 | 6/1988 | Matheson et al. . | |
| 4,832,844 | 5/1989 | Ayers . | |
| 4,834,885 | 5/1989 | Misgen et al. . | |
| 4,853,118 | 8/1989 | Brownell et al. . | |
| 4,872,976 | 10/1989 | Cudaback . | |
| 4,883,083 | 11/1989 | Fisher et al. . | |
| 4,922,960 | 5/1990 | Oelschlaegel . | |
| 4,935,127 | 6/1990 | Lowsky et al. . | |
| 4,990,247 | 2/1991 | Vandenberk . | |
| 5,037,539 | 8/1991 | Hutchins et al. . | |
| 5,104,537 | 4/1992 | Stifelman et al. . | |
| 5,342,519 | 8/1994 | Friedmann et al. . | |
| 5,381,826 | 1/1995 | Franz | 137/559 |
| 5,390,701 | 2/1995 | Lessley | 137/549 |
| 5,395,518 | 3/1995 | Gulsvig . | |
| 5,433,241 | 7/1995 | Robinson | 137/549 |
| 5,501,791 | 3/1996 | Theisen et al. . | |
| 5,606,989 | 3/1997 | Roll et al. . | |

FOREIGN PATENT DOCUMENTS

| | | |
|---|---|---|
| 0 738 528 A2 | 10/1996 | European Pat. Off. . |
| 73097 | 5/1916 | Switzerland . |

*Primary Examiner*—A. Michael Chambers
*Attorney, Agent, or Firm*—Merchant & Gould P.C.

[57] ABSTRACT

A filter arrangement for filtering fluid comprises a housing and a valve arrangement. The housing includes an inlet, an outlet, and a draining aperture. The valve arrangement is constructed and arranged to move between a closed position and an open position without the use of threads. The closed position prevents evacuation of fluid from the housing through the draining aperture, and the open position permits evacuation of fluid from the housing through the draining aperture. One valve arrangement may include a pair of ports and a pair of air vents. The valve is actuated by aligning the ports and air vents on a sliding sealing surface. An indicator arrangement including a float and a clear window is provided to give the user a visual indication of the level of water within the filter. Methods for using the constructions herein are provided.

10 Claims, 9 Drawing Sheets

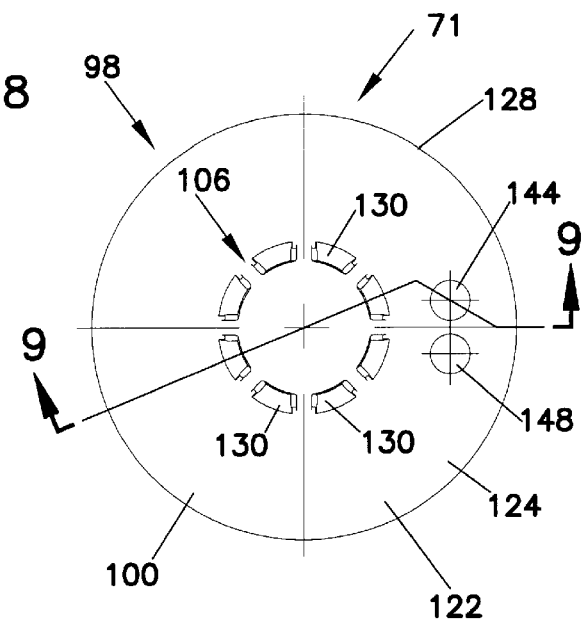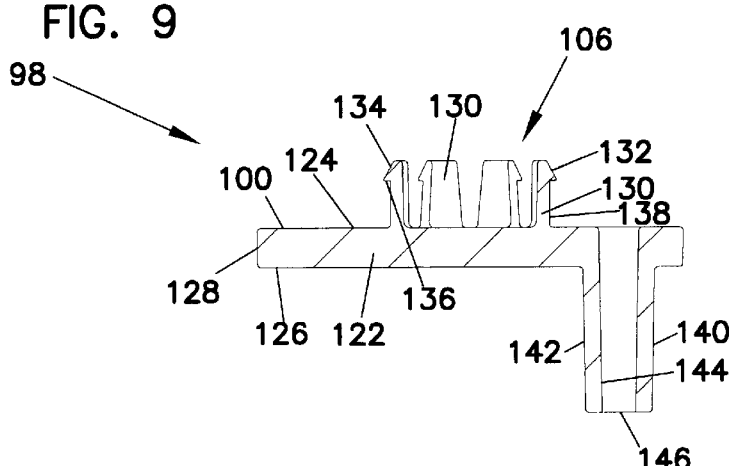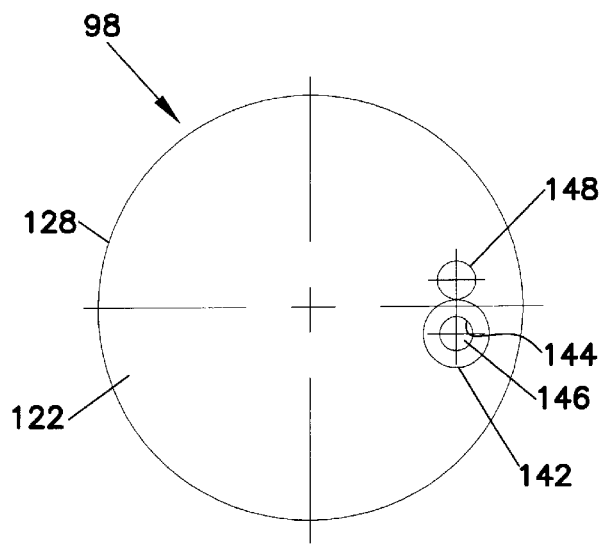

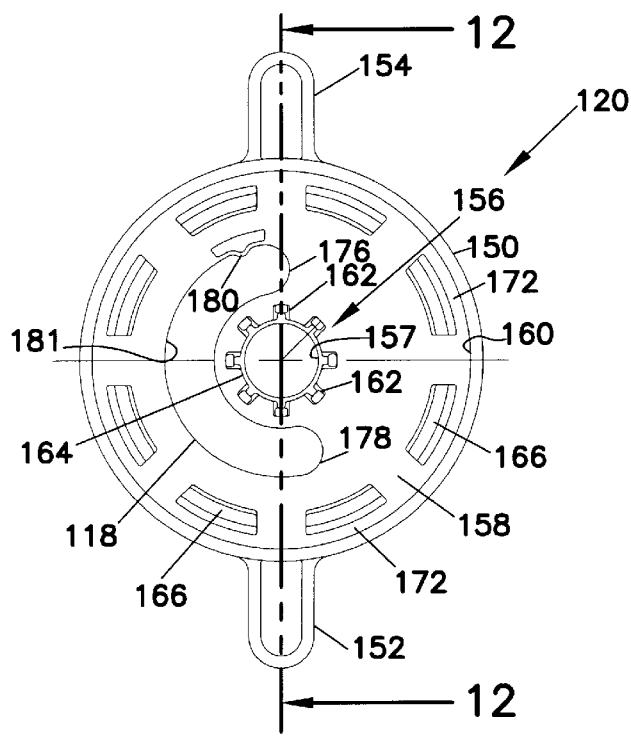

FLUID FILTER ARRANGEMENT INCLUDING VALVE ARRANGEMENT, FLUID LEVEL INDICATOR, AND METHODS THEREOF

This application is a Divisional of application Ser. No. 08/914,626, filed Aug. 19, 1997, which application(s) are incorporated herein by reference.

SUMMARY OF THE INVENTION

This invention relates generally to fluid filters, drainage valves, and methods. In certain particular embodiments shown, it relates to fluid filters of the spin-on type. More particularly, the invention relates to a drainage valve and a fluid-level indicator in a fluid tank, or a fluid filter. Methods of accomplishing a preferred drainage valve and fluid-level indicator are provided.

BACKGROUND OF THE INVENTION

Filters have been employed in a variety of applications including hydraulic systems, fuel systems, and engine lubrication systems. Such filters may generally be "spin-on" type filters and include a filter element within a can or housing having a cover or attachment plate at one end by which the filter can be screwed onto or off of a filter head. A central opening and several surrounding openings in the cover are typically provided to direct flow through the filter and filter element therein, which flow can be either an inside/out (reverse flow) or outside/in (forward flow) direction relative to the filter element. Spin-on filters are usually used only once before removal and replacement.

Fluid filters may include fuel/water separators. In a fuel/water separator, water is separated from a fuel/water mixture, in order to prevent damage to downstream engine components. Fluid filters which remove water will tend to accumulate the separated water by gravity at the bottom of the housing. The water should eventually be removed from the housing. Some models of liquid filters incorporate a mechanism to remove the water from the housing by using a pipe plug or a petcock. Typically, a threaded shaft is used to actuate these mechanisms. That is, the shaft is turned to move it linearly away from and out of the housing, until separation from the housing. They often require several turns, until separated from the housing. Often, the device begins to drain fluid as soon as it becomes unseated or loosened. The leaking fluid may run onto the operator's hand and down the arm as the device is turned the additional revolutions to the open, or separated, position. When the mechanism is to be closed, the operator is exposed to the fluid as the threaded shaft or plug is rotated several turns before it becomes closed or seated. These devices may often incorporate wrench flats or knurled covers to transmit the high amount of torque required to compress a seal to prevent leakage. A similar amount of torque may often be required to break the device free before it can be rotated by hand. Improvements are desirable.

SUMMARY OF THE INVENTION

The present invention is directed to a filter arrangement for filtering a fluid, typically liquid. To achieve the advantages of the invention and in accordance with the purposes of the invention, as embodied and broadly described herein, a filter arrangement for filtering fluid comprises a housing and a valve arrangement. The housing has an inlet for accepting fluid therein, an outlet for the passage of filtered fluid therethrough, and a draining aperture. The draining aperture is for evacuating fluid, water for example, from the filter arrangement. The valve arrangement is constructed and arranged to rotatively move between a closed position and an open position, without the use of threads. That is, in order to open the valve, there is no repetitive rotation to linearly move any structure away from the housing. The closed position prevents evacuation of fluid from the housing through the draining aperture, and the open position permits evacuation of fluid from the housing through the draining aperture. This arrangement is advantageous in that the valve can be actuated quickly and easily by the operator, which prevents excessive fluid loss and resulting safety hazards. Operator contact time is minimized, which means less contact with the fluid and related health hazards.

Preferably, the valve arrangement defines a channel in fluid communication with the drainage aperture. The channel is sealed when the valve arrangement is in the closed position, and the channel is unsealed when the valve arrangement is in the open position to allow fluid flow therethrough. Preferably, a collar defines a first channel section and a valve stem defines a draining aperture or port. The collar is secured to the housing, and the valve stem is movable relative to the collar between opened and closed positions. In the open position, the first channel section and draining aperture are aligned. In the closed position, the first channel section and draining aperture are not aligned.

Preferably, the valve stem is secured to an operator-controlled knob resting on the exterior of the housing. The knob may include a pair of flanges for gripping by an operator in order to transmit torque to the valve stem and move it between the open and closed positions.

The filter arrangement preferably includes a sealing gasket seated within the collar including a periphery circumscribing the first channel section. Preferably, the draining aperture in the valve stem is movable within and outside of the periphery of the sealing gasket.

Preferably, the valve arrangement includes a pair of detents, or stops, to provide a tactile indication for when the valve arrangement is either in the open position or the closed position. This provides a positive feel to the operator for the open and closed positions.

Preferably, the filter arrangement includes an indicator arrangement in the housing constructed and arranged to provide a visual indication whether a water level in the housing has reached a predetermined level. The indicator arrangement preferably includes a float and a window. The float has a density sufficient to float in water and sink in organic fluid. Preferably, the window is defined by the valve stem.

The filter arrangement includes filter media within the housing defining an open filter interior. In some embodiments, the filter media includes cellulose media coated with a hydrophobic coating to separate water from fuel.

In another aspect, the invention is directed to a filter arrangement for filtering a fluid mixture having at least first and second fluids. The filter arrangement comprises a housing, a filter construction within the housing, and an indicator arrangement in the housing. The housing includes an inlet, an outlet, and a draining aperture at a first end thereof. The filter construction is constructed and arranged to separate the fluid mixture into the first and second fluids. The indicator arrangement is constructed and arranged to indicate whether a level of the first fluid in the housing has reached a predetermined level. Preferably, the indicator arrangement provides a visual signal when the level of the first fluid has reached the predetermined level.

In one embodiment, the indicator arrangement includes a float and a window. The float has a density sufficient to float in the first fluid and sink in the second fluid. Preferably, the density (specific gravity) of the float is about 0.90 to 0.95.

In certain arrangements, the float is movably mounted within the window. The float is visible through the window when the first fluid level is below the pre-determined level. The float is not visible through the window when the first fluid level has reached or exceeded the pre-determined level.

Preferably, the float has a dark exterior color, and the window is constructed of a clear material.

Preferably, a cage is mounted within the housing. The cage is constructed and arranged to mount the float between the filter construction and the first end. The cage helps to limit the vertical motion of the float, so that the lower end of the float does not become disengaged from an inner surface of the window.

In certain arrangements, the filter arrangement further includes a valve arrangement constructed and arranged to permit drainage of the first fluid through the drainage aperture. The valve arrangement may include a collar and a valve stem, with the valve stem defining the window.

Preferably, the visual signal of the indicator arrangement includes a color change. For example, the color may change from dark to light.

The invention also provides for a filter arrangement including a housing and a valve arrangement. The valve arrangement is secured to the housing and includes an O-ring seal member and a draining member. The draining member defines a first aperture. Preferably, the O-ring seal member and the first aperture are mounted for relative eccentric movement between first and second positions. That is, the movement between the O-ring seal member and first aperture is such that the first aperture is within the O-ring seal member when in the first position, and outside of the O-ring seal member when in the second position.

Preferably, the O-ring seal member is seated within a collar fixed relative to the housing. The collar defines a second aperture, or channel section. The first position includes an alignment of the first and second apertures to be in fluid communication with the drainage aperture of the housing.

In one embodiment, the draining member includes a valve stem having a channel section. The channel section is constructed and arranged to permit passage of air into the housing. In particular, incoming air creates a head over the water which breaks the vacuum and allows the water to drain.

In another aspect, a valve arrangement associated with a fluid tank for permitting selective passage of fluid therefrom is provided. The valve arrangement comprises a collar arrangement defining a first open channel section, and having a seal member. The seal member defines a closed perimeter. A stem arrangement defines a draining aperture or port, and is slidably secured to the collar arrangement for relative slidable movement between first and second positions. The draining aperture is within the seal member perimeter when in the first position; and the first channel section and draining aperture are aligned when in the first position. The draining aperture is outside of the seal member perimeter when in the second position; and the first channel section and draining aperture are out of alignment when in the second position.

Preferably, a control member is secured to the stem arrangement to move the stem arrangement between the first and second positions. The control member may include pair of stops to provide a tactile indication of the first and second positions.

In one preferred system, the stem arrangement includes a clear window constructed and arranged to accommodate a float member to provide a visual indication of fluid level, when the valve arrangement is mounted to the fluid tank.

A method for draining a fluid-holding tank, such as a fluid filter, is provided. The method includes a step of opening a drainage aperture in a fluid filter housing to allow flow of fluid therethrough. The step of opening includes twisting a knob covering the aperture no more than 180° relative to the housing. In one preferred method, the step of opening includes aligning a port defined by a disk secured to the knob with a channel defined by a collar secured to the housing. Preferably, constructions as described herein above are used.

The accompanying drawings, which are incorporated in and constitute a part of this specification, illustrate example embodiments of the invention and together with the description, serve to explain the principles of the invention. In the drawings:

BRIEF DESCRIPTION OF THE DRAWINGS

FIG. 8 is a top plan view of a valve stem usable in a valve arrangement, according to the present invention;

FIG. 9 is a cross-sectional view of the valve stem depicted in FIG. 8, taken along the line 9—9;

FIG. 10 is a bottom plan view of the valve stem depicted in FIG. 8;

FIG. 11 is a top plan view of a knob usable in a valve arrangement, according to the present invention;

FIG. 12 is a partially schematic, cross-sectional view of the knob depicted in FIG. 11, taken along the line 12—12;

FIG. 13 is a bottom plan view of the knob depicted in FIG. 11;

DETAILED DESCRIPTION OF THE PREFERRED EMBODIMENTS

I. Some Problems with Conventional Arrangements

Figure 1:
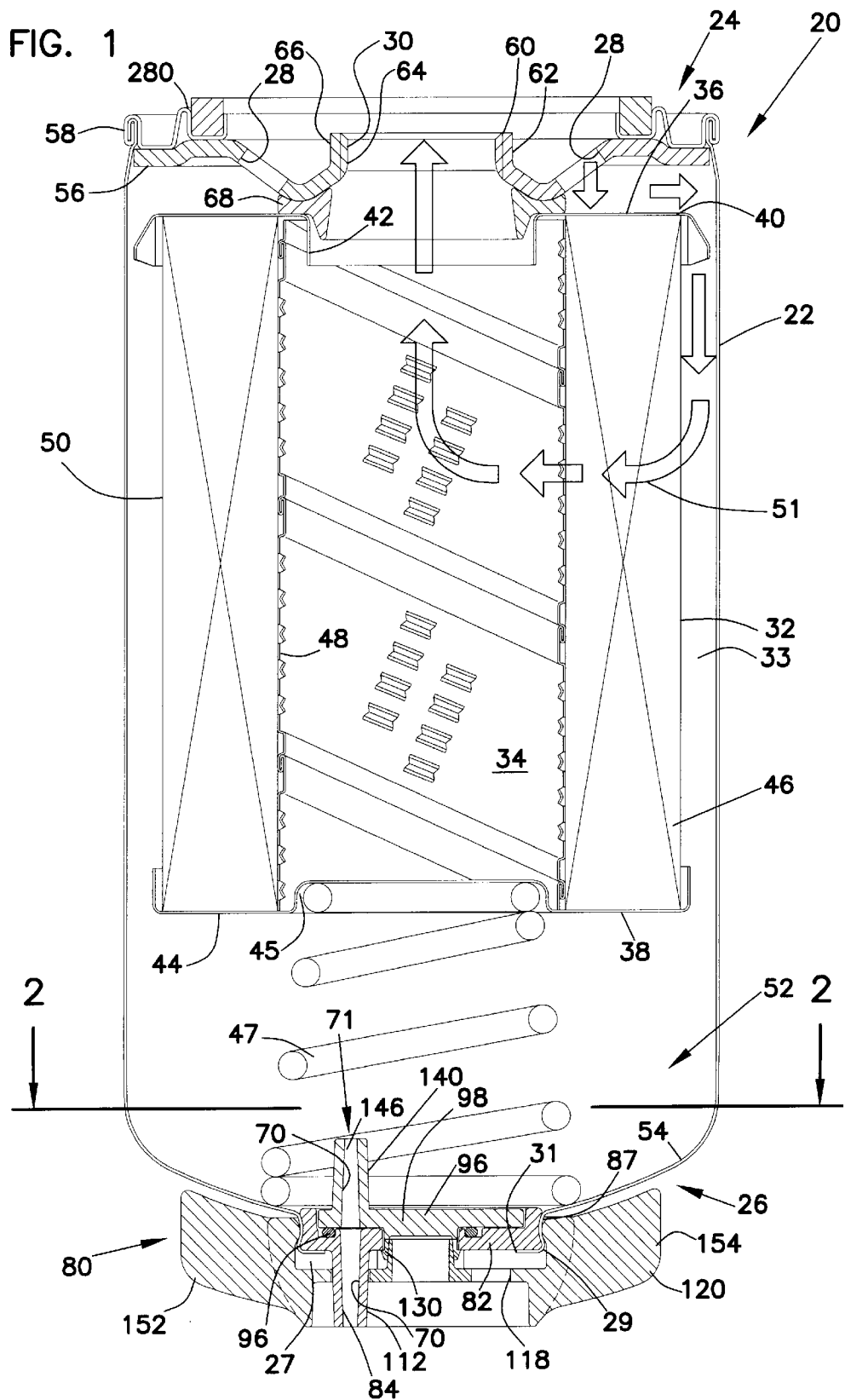
FIG. 1 is a partially schematic, cross-sectional view of a first embodiment of a fluid filter, with a valve arrangement depicted in an open position, according to the present invention.

In order to drain fluid filters, a variety of arrangements have been used. Such arrangements include pipe plugs, petcocks, vented drain valves with suction circuit applications, and variations on each of these. Typically, these conventional arrangements use a threaded fastener as a mechanism for actuation.

A threaded pipe plug-style drain may require a hand tool to loosen, followed by several revolutions of engagement before the plug can be removed. The disadvantages include the fact that a hand tool is often required to both break loose and seal the plug. If the device is over-torqued with a hand tool, the threads may strip, or the nut may break loose. Either failure will cause excessive fluid loss and will mandate filter replacement. Once removed, the plug can be easily dropped or lost. Typically, the plug must be properly orientated for threaded engagement to begin. In addition, fluid is flowing while the operator is attempting to install the plug. This may lead to a number of problems. For example, visual contact can be difficult and hazardous if the operator must be under the filter. A large amount of fluid, such as petroleum, can be spilled and lost while attempting to install the plug.

A petcock may require a hand tool to break loose and/or seal the petcock. As with the pipe plug, if the device is over-torqued with a hand tool, the threads may strip, or the nut may break loose. Further, as with the threaded pipe plug, the fluid is flowing while the operator is manipulating the petcock. Several turns are required to seat the petcock from a full open position. Depending on accessibility, a significant amount of fluid can again be spilled or lost while closing the petcock. This lost fluid presents both health and safety hazards.

Vented drain valves have many of the same disadvantages as petcocks.

In order to know when to drain the fluid filter, some arrangements have provided a viewable indication by use of a clear plastic bowl, typically retained to the assembly by a threaded attachment, with a necessary seal member. For example, when used in a fuel/water separation device, water is collected by gravitational separation to the bottom of the filter. The water is collected in the clear plastic bowl, and a line separating the water and the fuel is visible, indicating the need for water drainage. Such clear bowls also typically incorporate a valve for the purpose of draining the accumulated water, including the use of yet another seal member.

There are several disadvantages to this approach. First, the cost of the clear plastic bowl outweighs its value as a water level indication device. Second, the seal members on the bowl are often unreliable, resulting in fuel leakage which, in the worst case, could result in a vehicle fire, and at the least, cause minor fuel loss and environmental pollution. Third, the clear bowl, intended to be used indefinitely, quite often becomes clouded, dirty, or damaged, rendering it useless as a water level indication device. At times the bowl, even when clean, is not an effective indicator of water level. Depending on the color of the fuel, and the ambient lighting level where the fuel/water separator device is located, the line dividing the water and fuel in the clear bowl is not clearly visible.

II. FIGS. 1–15

Reference will now be made in detail to the present preferred embodiments of the invention, examples of which are illustrated in the accompanying drawings.

In accordance with the invention, a filter arrangement is provided. As embodied herein, one example of a filter arrangement is illustrated in FIG. 1 generally at 20. The filter arrangement 20 filters fluids including gas or liquids, and more particularly, fuel, such as petroleum, diesel, or LNG. The filter arrangement 20 includes a generally cylindrical filter housing 22 having an open end 24 and a closed end 26. The filter housing 22 is of a generally thin-walled construction, and is typically formed from metal such as steel or other suitable materials. The filter housing 22 includes an inlet 28 in which fluid to be filtered enters the housing 22. The housing 22 includes an outlet 20 through which the filtered/separated fluid passes as it exits the housing 22. The filter arrangement 20 illustrated in FIG. 1 is a spin-on filter. However, other types of filter arrangements may be used in accordance with the principles of the invention described herein.

A filtering construction for filtering fluid is mounted within the housing. One example of a filtering construction is illustrated in the FIGS. generally at 32. Filter element 32 has a cylindrical shape and defines an open filter interior at 34. Element 32 includes an open end 36 and a closed end 38, at opposite ends thereof. Open end 36 is covered by an end cap 40. End cap 40 includes an opening 42 to permit access to the open filter interior 34, which is defined by the inner diameter of the filter element 32. The closed end 38 of the filter element 32 is covered by a second end cap 44. The second end cap 44 defines a recessed portion 45 centrally located between the regions of media 46.

The end caps 40, 44 are illustrated in the figures as sheet metal end caps with filter media 46 potted therein by a polymeric binder such as plastisol. However, it is contemplated that the end caps 40, 44 may also be constructed from a polymeric material.

The filter element 32 has a perforated inner liner 48. Preferably, the inner liner 48 is constructed of a perforated metal material, but can be made of other materials such as plastic. The filter media 46 surrounds the perforated inner liner 48 and also forms an exterior surface 50 of the filter element 32. The filter media 46 may include any media sufficient to effectively filter whatever fluid is in the system. The type of media will depend upon what fluid is being filtered, what kind of system the filter is in, and could include other variables. In terms of the principles of operation of the valve arrangement and indicator arrangement, there is no preference for any particular type of filter media. However, in a typical system, the filter media 46 can include a fluted or pleated media. In order to separate a mixture of fluids, such as water from fuel, the media may be coated with a hydrophobic coating on the filter media 46. The media 46 may include paper media or cellulose fiber media, sometimes including at least one side treated with polymeric fine fibers or expanded polytetrafluoroethlyene (PTFE). Other types of media may also be used.

Fluid is filtered, or separated, by passing through filter element 46 in a direction from the exterior surface 50 through the filter media 46 and inner liner 48. Arrows 51 in FIG. 1 illustrate a typical flow path of fluid through the filter arrangement 20. The inlet 28 corresponds to the upstream region of fluid flow, with the outlet 30 corresponding to the downstream region of fluid flow. The water separated from the fluid mixture travels by gravity to a reservoir 52, located at a bottom region of the housing 22, when the housing 22 is oriented in a direction as shown in FIG. 1. Because water is typically denser than fuel, the water typically collects at the interior 54 of the closed end 26 of the housing 22, with fuel floating on top of it.

A spring 47 is positioned between the recessed portion 45 of the second end cap 44 and the bottom 54 of the housing 22. The spring 47 biases the filter element 32 against the open end 24 of the filter arrangement 20 to hold the filter element 32 above the fluid reservoir 52.

The above-described general operation of the filter arrangement 20 is of a type described in U.S. Pat. No. 4,369,113 to Stifelman, hereby incorporated by reference. As described in U.S. Pat. No. 4,369,113, fluid filters may be utilized for filtering from the inside outwardly, or the outside inwardly. For the preferred embodiment described herein, the filter is described with respect to filtration flow resulting from the outer annular space 33 into the filter interior 34. However, the opposite arrangement may be utilized with appropriate modifications in the filter head, as will be understood to those of ordinary skill in the art.

The filter arrangement 20 includes a cover 56 disposed within the housing 22 and adjacent to the open end 24 to close off the open end 24 of the housing 22. Structure is provided to mount the cover 56 to the housing 22 to form a single unitary filter 20. For example, such structure includes a roll seal 58 and an array of spot welds between cover 56 and gasket retainer 280. Cover 56 includes a central cylindrical opening 60 defined by a tubular construction 62. Tubular construction 62 includes an internal cylindrical wall 64 and an external cylindrical wall 66. The tubular construction 62 is sized to engage the open end 36 of the filter element 32. An axial seal member 68 is located between the cover 56 and the opening 42 in the end cap 40 of the filter element 32. The tubular construction 62 permits a filtered or separated fluid to flow from the filter arrangement 20 to a filter head. As such, the tubular construction 62 forms part of the housing outlet 30. The internal wall 64 of the tubular construction 62 may include threads mateably engaging the filter head, such that the filter arrangement 20 may be spun onto the assembly.

Figure 3:
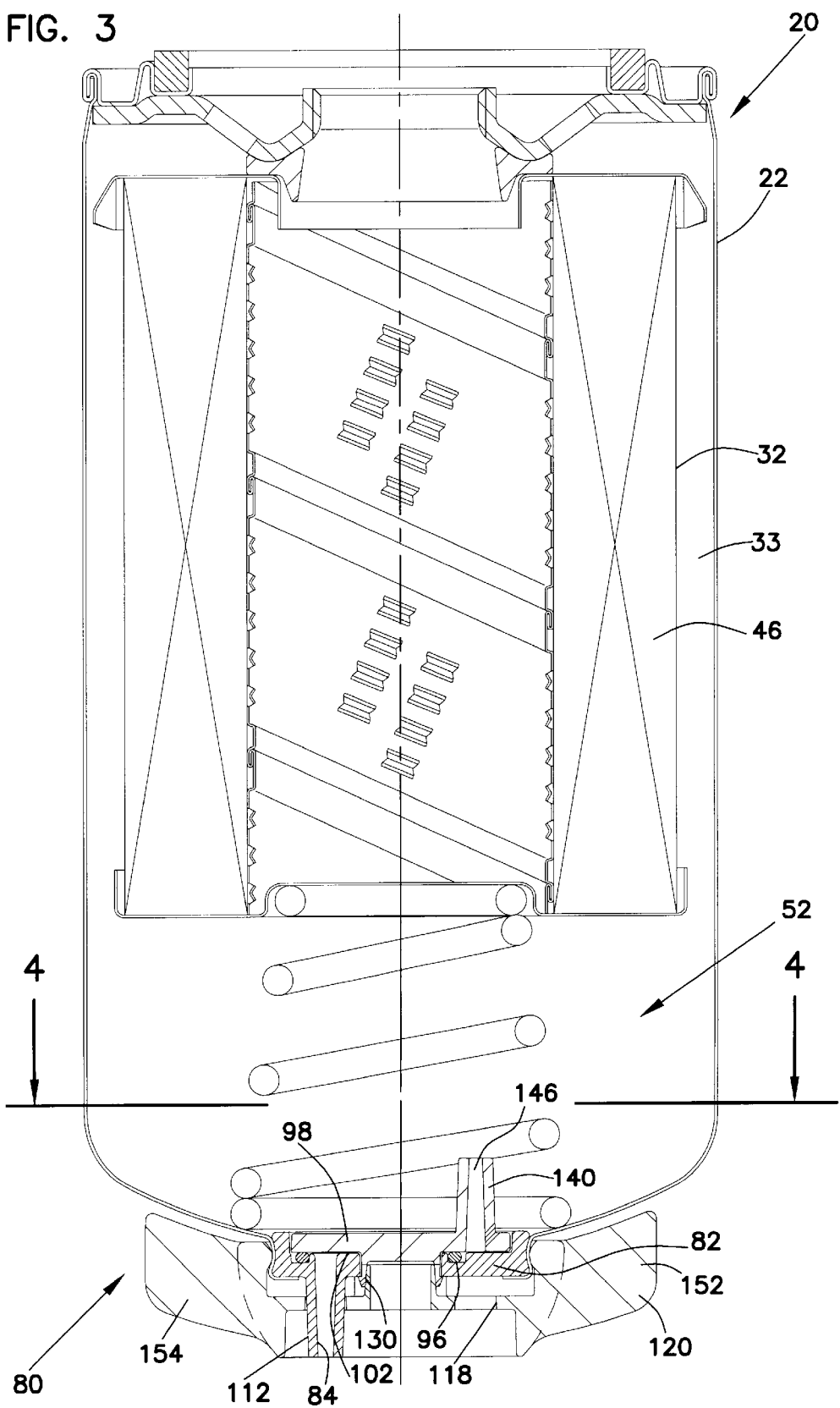
FIG. 3 is a cross-sectional view of the first embodiment of a fluid filter, with the valve arrangement depicted in a closed position, according to the present invention.

The housing 22 defines at its closed end 26 a circular portion 27 defining a drainage aperture 31. In the illustrated embodiment, the drainage aperture 31 accommodates a valve arrangement, to be explained in more detail below. The housing 22 extends from the perimeter defining drainage aperture 31 through portion 27 and bends at bend 29 to a projected section 87. The combination of portion 27 and projected section 87 helps to secure the valve arrangement to the housing 22. As illustrated in FIGS. 1 and 3, projected section 87 and portion 27 fit around a rim 86 of a collar 82. Collar 82 is part of the valve arrangement, to be described in more detail below.

As a fluid mixture, such as a fuel/water mixture is separated by the filter element, the fluid to be separated, such as water, collects at the bottom of the housing in the reservoir 52. When the amount of water collected in the reservoir reaches a certain level, it should be drained from the filter arrangement. The filter arrangement of the present invention includes a valve arrangement for providing a convenient, easy, and safe mechanism for draining liquid from the filter arrangement.

Figure 2:
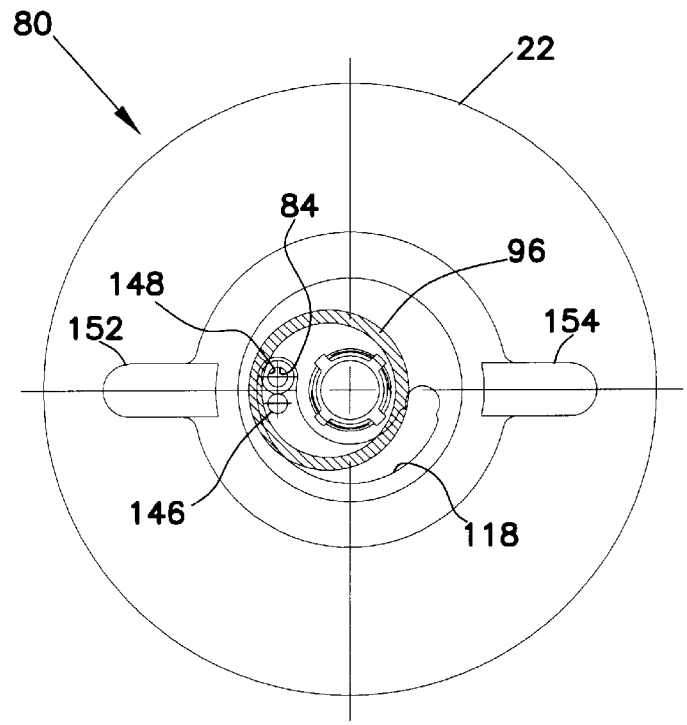
FIG. 2 is a partially schematic cross-sectional view of FIG. 1, taken along the line 2—2, showing a channel section in a collar and an aperture in a valve stem aligned and within an O-ring gasket.
Figure 4:
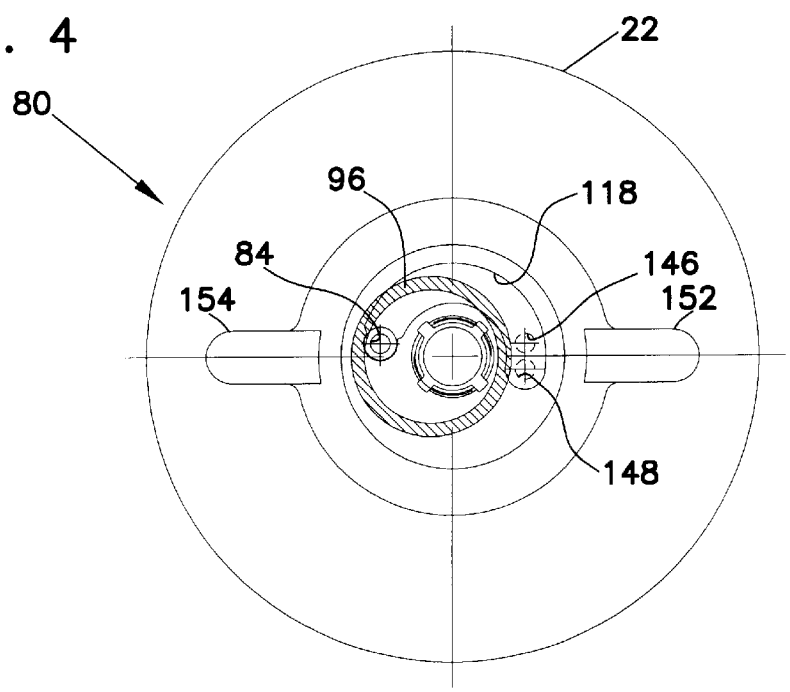
FIG. 4 is a schematic cross-sectional view of FIG. 3, taken along the line 4—4, showing an aperture in a valve stem rotated outside of an O-ring gasket and out of alignment with a channel section in a collar.

In one embodiment illustrated in FIG. 1, a valve arrangement is shown generally at 80. The valve arrangement is constructed and arranged to rotatively, and non-threadably, move between a closed position and an open position. The open position, one example which is illustrated in FIGS. 1 and 2, permits the evacuation of fluid from the housing through the draining aperture 31 of the housing 22. The closed position, one example which is illustrated in FIGS. 3 and 4, prevents the evacuation of fluid from the housing 22 through the draining aperture 31. The valve is actuated by aligning ports on a sliding sealing surface. Therefore, the integrity of the seal is not dependent on torque-induced compression, as in arrangements using threads.

Figure 5:
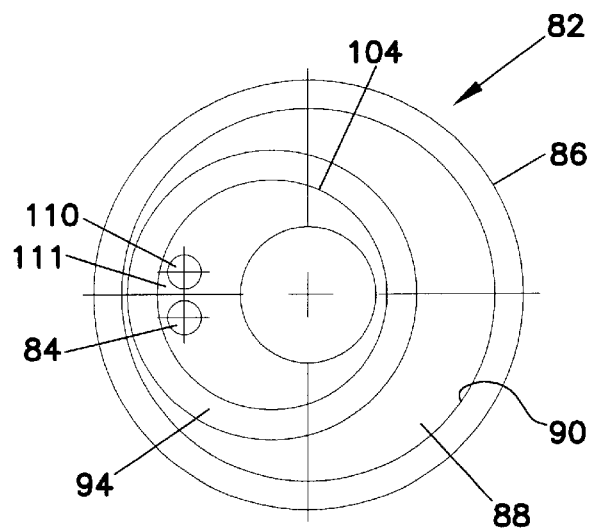
FIG. 5 is a top plan view of a collar usable in a valve arrangement, according to the present invention.
Figure 7:
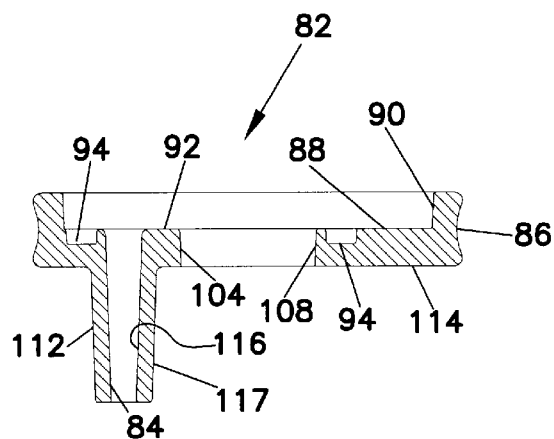
FIG. 7 is a cross-sectional view of the collar depicted in FIG. 6, taken along the line 7—7.
Figure 6:
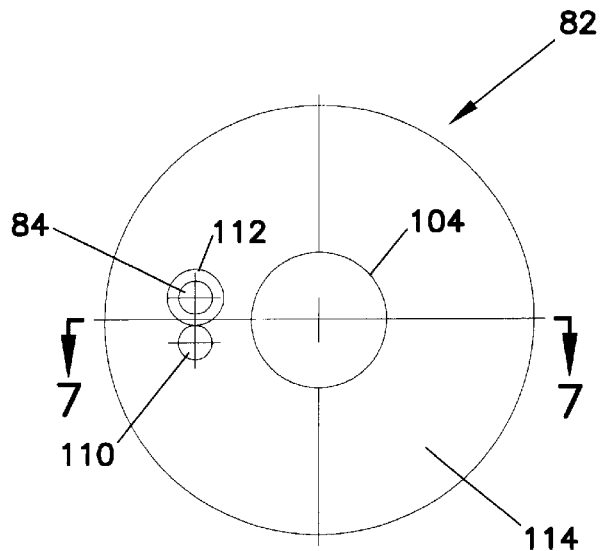
FIG. 6 is a bottom plan view of the collar depicted in FIG. 5.

In one preferred valve arrangement, structure is provided for defining a first port or channel section and a second port or draining aperture. In the open position, the first and second ports are aligned to form a channel, and in the closed position, the first and second ports are not aligned. In one particular arrangement shown in the figures, a collar 82 defines a first channel section 84 with a port. The collar 82, shown in more detail in FIGS. 5–7, is generally cylindrical in shape with an outer rim 86. Rim 86 is generally recessed to provide for a smooth engagement with the projected section 87 of the housing. Preferably, the outer rim is on a radius of about 0.02 inches.

Collar 82 defines an inner recessed portion 88. Recess portion 88 is defined by a side wall 90 and a bottom wall 92. Recessed portion 88 is for accommodating a draining member, and more specifically, a valve stem arrangement, to be described in more detail below. The bottom wall 92 defines a gasket receiving groove 94. The gasket receiving groove 94 is for accommodating a sealing member or gasket 96, such as an O-ring, which helps to maintain the integrity of the seal formed between recessed portion 88 and a sliding surface engagement portion 100 of a valve stem 98, FIG. 8 described below. The recessed portion 88 also defines a sliding surface for accommodating a sliding motion of the surface engagement portion 100 in the valve stem 98.

As illustrated in FIGS. 2 and 4, the gasket 96 is arranged relative to the first channel section, such that the first channel section is always within the interior of the O-ring or gasket 96. A draining port 148, FIG. 9, is arranged eccentrically relative to the O-ring gasket 96. That is, the O-ring 96 and draining port 148 move relative to one another, so that the draining port 148 is movable into the interior of the O-ring 96 (FIG. 2) and out of the interior of O-ring 96, FIG. 4. In the illustrated embodiment, the O-ring 96 is stationary, while the draining port 148 moves relative thereto. However, these parts could be reversed in other embodiments of the invention. When the first channel section 84 and draining port 148 are aligned, FIG. 2, an open channel is formed and allows fluid communication between the housing interior and the external environment. When the first channel section 84 and draining port 148 are aligned, FIG. 2, the gasket 96 acts as a seal to prevent leakage of any fluid from any regions other than through the channel 70.

The collar 82 defines a central aperture 104 located approximately centrally within the collar 82. The aperture 104 is for accommodating a flanged ring 106 on the valve stem 98. The aperture 104 includes an inner cylindrical wall 108 which allows the flanged ring 106 to slide against when the valve arrangement 80 is being moved between its open and closed positions.

Collar 82 also includes an air hole 110 located adjacent to the channel section 84. The air hole 110 is for permitting air flow into the interior 54 of the housing 22. Specifically, the air hole 110 aligns with a second channel section 146, FIG. 9, when the valve arrangement 80 is in the open position. Through cooperation of the air hole 110 and fluid passage defined by the second channel section 146, the valve arrangement 80 is self-venting. Incoming air creates a head over the liquid collected at the bottom of the housing, which breaks a vacuum and allows the liquid to drain through the draining port 148 and first channel section 84.

In the illustrated embodiment, the air hole 110 includes a diameter about the same as the diameter of channel section 84. FIG. 5 illustrates the relative arrangement of aperture 104 with respect to first channel section 84 and air hole 110. A line which intersects the center of aperture 104 passes between the first channel section 84 and the hole 110 in region 111.

The collar 82 includes a column 112 projecting from a bottom surface 114 of the collar 82. The column 112 is cylindrical in shape and defines the channel section 84 along its internal cylindrical wall 116. As shown in FIG. 7, the first channel section 84 is in communication with the recessed portion 88. The column 112 slides within a groove 118 defined by a knob 120. The features of the knob 120 and groove 118 are described further below. The column 112 includes a generally smooth outer cylindrical wall 117 in order to facilitate a sliding engagement between the column 112 and the groove 118, when adjusting the valve arrangement 180 between its open and closed positions. Preferably, the column has an outer diameter of about 0.02 inches and an inner diameter (that is, the diameter of the channel) of about 0.01 inches.

The column 112 is particularly adapted to accommodate a draining conduit. For example, a drain hose may be fitted around the outer circumference of the column 112. This permits liquid drained from the bottom of the housing 22 to be directed to a convenient location exterior of the housing 22.

The valve arrangement includes a draining member 71 for establishing fluid communication with the interior of the housing. The draining member 71 preferably includes a port or aperture which is movable into and outside of the O-ring sealing gasket 96.

In reference now to FIGS. 8–10, an example of one particular type of draining member is depicted as a valve stem 98. Valve stem 98 includes a circular disk 122 having a first surface 124, an opposite second surface 126, and an outer radial surface 128. The first surface 124 defines the sliding surface engagement portion 100 which mates with and slidably engages the bottom wall 92 of the collar 82. The radial surface 128 is a generally smooth surface and fits within the recessed portion 88 and against the side wall 90 of the collar 82.

Projecting away from the first surface 124 is a flanged ring 106. The flanged ring 106 includes a plurality of flange members 130 cantilevered or extending upright from the first surface 124. In certain preferred embodiments, as illustrated in FIG. 8, there are eight flange members 130 arranged concentricity to form a ring. The center of the ring may correspond to the center of the disk 122. Each of the flange members 130 includes a projection 132 at a free end thereof. The projection is defined by a camming surface 134 and a shoulder member 136. Flanged ring 106 slides within and is intimately connected to aperture 104 of the collar 82. The camming surface 134 of the projections 132 allow for the flanged ring 106 to easily slide into the aperture 104, during the assembly process. The shoulders 136 engage or hook the bottom surface 114 of the collar 82, in order to secure the valve stem 98 axially within the collar 82.

Each of the flange members 130 define a generally straight smooth wall 138 for slidable engagement with the inner cylindrical.wall 108 of the collar 82. Thus, the flanged ring 106 interlocks the valve stem 98 with the collar 82 and prevents axial motion, but permits the valve stem 98 to move rotationally within the collar 82. "Axial motion" is motion along an axis intersecting the centers of both the collar and valve stem.

The disk 122 defines the draining port adjacent to the second channel section 146. The draining port 148 has a diameter about equal to the diameter of the second channel section 146. The draining port 148 is for aligning with the first channel section 84 to permit outflow of liquid from the reservoir 52.

The valve stem 98 includes a column 140 projecting or extending away from the second surface 126 of the disk 122. The column 140 is cylindrical in shape and includes an outer wall 142 and an inner wall 144. The inner wall 144 defines the second channel section 146. The second channel section 146 aligns with and is in fluid communication with the air hole 110 when the valve arrangement 80 is in the open position.

When the valve arrangement 80 is positioned within the filter arrangement 20, the second channel section 146 is in fluid communication with the reservoir 52 of the filter arrangement 20. As such, when the valve arrangement 80 is in the open position, FIGS. 1 and 2, air flows into air hole 110 and then through second channel section 146. This allows air to vent above the liquid level within the reservoir 52. This creates a head over the liquid, typically water, which breaks the vacuum and allows the liquid to drain through the draining port 148 and the first channel section 84. The draining port 148 and second channel section 146, when in the open position, are within the perimeter of O-ring 96.

When the valve arrangement 80 is in the closed position, FIGS. 3 and 4, the draining port 148 and second channel section 146 are still in fluid communication with the reservoir 52, but are sealed closed by engagement with the bottom wall 92 of the collar 82. They are located outside of the perimeter of the O-ring 96. Thus, as the valve stem 98 is rotated within the collar 82, the first channel section 84 and draining port 148 are moved into and out of fluid communication with each other. This corresponds to the "open position" of the valve arrangement" (when the first channel section 84 and draining port 148 are aligned to form channel 70, FIG. 1) and the "closed position" of the valve arrangement (when the first channel section 84 and draining port 148 are out of fluid communication with each other, FIG. 3).

Preferably, the second channel section 146 has a diameter about equal to the diameter of the first channel. One preferred diameter is about 0.02 inches.

Figure 17:
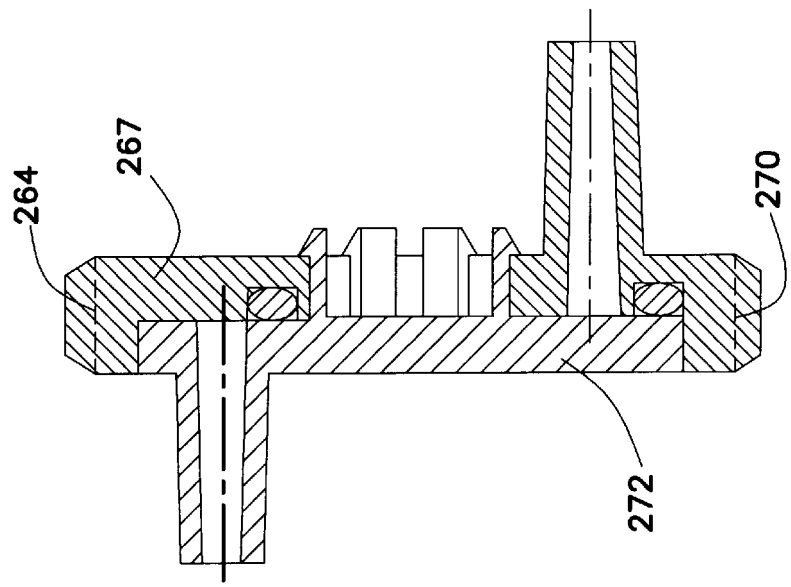
FIG. 17 is a partially schematic, cross-sectional view of the collar and valve stem assembly depicted in FIG. 16, taken along the line 17—17.
Figure 16:
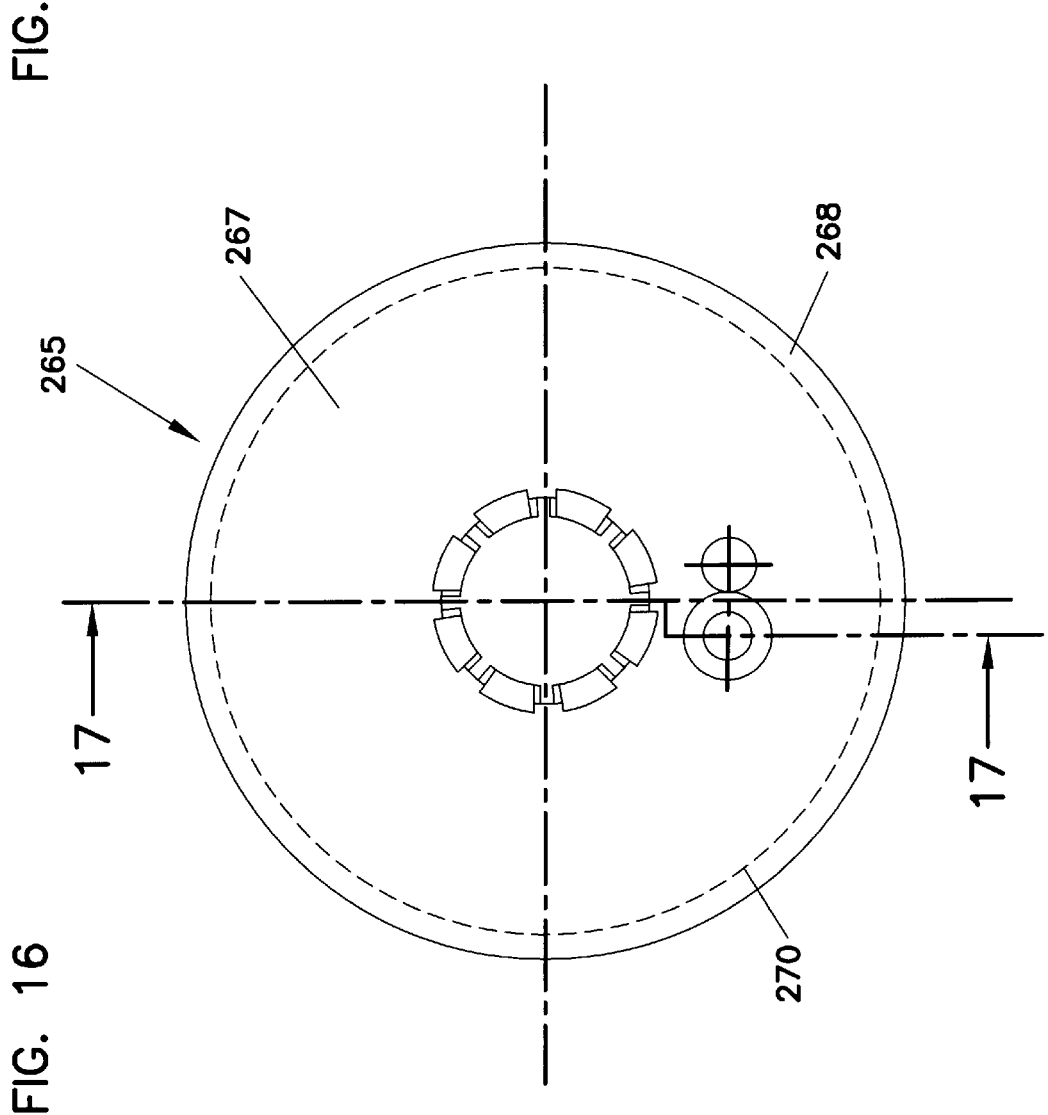
FIG. 16 is a bottom plan view of an alternate collar and valve stem assembly.

An alternate collar and valve stem assembly is illustrated in FIGS. 16 and 17 at 265. The assembly 265 is constructed and arranged to permit the valve arrangement 80 to retrofit conventional pipe plugs, radiator style petcocks, and threaded engaged drain valves. While a variety of arrangements are contemplated, and the particular embodiment illustrated, the collar 267 includes a fastening arrangement 268 to permit it to be retrofit into conventional pipe plugs, petcocks, and threaded engaged drain valves. In particular, the attachment arrangement 268 includes threads 270. Threads 270 are placed along the outer rim 269 of the collar 267. Therefore, the collar 267 differs from the collar illustrated in FIG. 7 by at least having threads 270 in place of the groove defined at 86 in FIG. 7. The threads 270 engage mating threads in, for example, a housing. The valve stem 272 fits within and is in intimate contact with the collar 267. The thickness of the collar 267 is sufficient to include enough threads 270 to form a tight seal with a threaded boss which it would mount to. This threaded boss could be on any liquid reservoir.

The valve arrangement 80 includes a control dial or knob 120. As illustrated in FIGS. 11–13, the knob 120 is generally cylindrical in shape with an outer periphery 150 and a pair of diametrically opposite flange members 152, 154.

The knob 120 defines a first cavity 151 and an opposite second cavity 153. The first cavity 151 is defined by an inner wall 160 and a bottom wall 158.

Knob 120 is operatively associated with the valve stem 98 in order to control movement of the valve stem, relative to the collar 82. That is, the knob 120 is constructed and arranged to impart relative motion between the valve stem 98 and the collar 82, and move the valve arrangement between open and closed positions. This could include a variety of structures and arrangements. In the particular example illustrated, the knob 120 is secured to the valve stem 98 through an interlock at a hub 156. The hub 156 includes a cylindrical wall 157 projecting upright from the bottom wall 158.

The hub 156 includes a series of spokes 162 projecting radially from the cylindrical wall 157 of the hub 156. Between each of the spokes 162 is a receiving channel 164. Between each of the spokes 162, that is, in each of the receiving channels 164, a flange member 130 of the valve stem 98 is received. Therefore, the valve stem 98 is fixedly secured to the knob 120. When the knob 120 is rotated, the hub 156 is rotated, which is interlocked with the valve stem 98 through the meshing of the flange members 130 in the spokes 162. Thus, when the hub 156 is rotated, this moves the valve stem in rotation along with the knob 120.

The knob 120 includes a plurality of projecting tongues 166 extending from the bottom wall 158 of the first cavity 151. The tongues 166 are located adjacent to the inner wall 160, but are spaced from the inner wall 160 at space 172. The tongues 166 include a first flat portion 168 and a rounded projecting head 170 extending from the flat portion 168. The tongues 166 help to seat the collar 82 within the first cavity 151. The rounded heads 170 include smooth surfaces for engagement with the projected section 87 of the housing 22. Together, the tongues 166 and the space 172 between the tongues 166 and the inner wall 160 contribute to a convenient assembly process, when mounting the knob 120 on the housing 22.

The bottom wall 158 of the first cavity 151 defines a groove 118. The groove 118 is arc-shaped and extends somewhat over 180° within the bottom wall 158. Preferably, the arc of the groove extends about 210°. The groove 118 is for accommodating the column 112 on the collar 82. The groove 118 and the O-ring 96 are positioned eccentrically relative to one another. This allows the draining port 148 and second channel section 146 to move into and out of the interior of the O-ring 96.

Preferably, the groove 118 defines a first stop surface, or detent, 176, and a second stop surface, or detent, 178. The first and second stop surfaces 176, 178 provide a tactile indication to the operator for when the valve arrangement is fully positioned in either its open position or its closed position. In particular, when the valve arrangement 80 is in the closed position, FIGS. 3 and 4, the column 112 is abutted against the first stop surface 176. When the knob 120 is rotated relative to the housing 22, and thus the collar 82 which is fixed to the housing 22, the column 112 slides within the groove 118 until it abuts the second stop surface 178. When the column 112 abuts the second stop surface 178, the valve arrangement 80 is in the open position, FIGS. 1 and 2.

The groove 118 includes a protrusion 180 extending from its side wall 181 to lock the valve arrangement in the closed position. The width of the groove 118 at the protrusion 180 is somewhat smaller than the outer diameter of the column 112. This introduces an interference fit between the column 112 and the groove 118 in the region of the protrusion 180. As such, when the operator moves the knob 120 and slides the groove relative to the column 112, when it passes the protrusion 180, the operator will receiving tactile feedback from the mechanism. That is, the operator will feel the column move past the protrusion 180 and know when the valve arrangement has been locked into its closed position.

Likewise, the operator will feel the valve arrangement be "unlocked" from the closed position when the column moves past the protrusion 180. This provides advantages in that the operator does not need to be viewing the valve arrangement in order to know when it is open and closed. This saves the operator from hazards such as fuel dripping down into his face.

FIG. 13 illustrates a bottom plan view of the knob 120. The knob 120 includes an outer wall 184 leading to a circular rim 186. The circular rim 186 defines the second cavity 153. The central hole 155 defined by the inner wall 157 of the hub 156 is in communication with the second cavity 153. A plurality of through-slots 167 are located adjacent to the tongues 166 along the perimeter of the knob 120.

In operation, a fluid mixture including, for example, fuel and water flows through the inlet 28 and through the filter element 32. The filter media 46 separates the fluid mixture into fuel and water. The fuel passes through the outlet 30, while the water sinks by gravity to the reservoir 52.

When the water accumulates in the reservoir, the operator will move the valve arrangement 80 from the closed position, FIG. 3, to the open position, FIG. 1. The operator will grasp the first and second flanges 152, 154 of the knob 120 and rotate the knob about one-half turn, or about 180°, relative to the housing 22. As the knob 120 is rotated, the valve stem 98 is rotated one-half turn, or 180°. The collar 82 is not rotated, but is fixed to the housing 22. The sliding sealing surfaces of the valve stem and collar engage each other, and the first channel section 84 and draining port 148 of the collar 82 and valve stem, respectively, are moved into fluid communication with each other. The draining port 148 and second channel section 146 are moved into the interior of the O-ring 96. The air hole 110 in the collar 82 and second channel section 146 in the valve stem 146 are moved into fluid communication with each other. When this happens, air passes through the air hole 110 and through the second channel section 146. The incoming air creates a head over the water in the reservoir, which breaks the vacuum. The water in the reservoir 152 then passes through the draining port 148, through the first channel section 84, and out of the housing 22. The O-ring 96 prevents leakage of fluid from between the collar and valve stem. The operator knows that the knob is in the open position because he feels the column 112 abut the second stop surface 178 of the groove 118.

After the water is drained from the filter, the operator grasps the knob and rotates the knob about one-half turn (or 180°) relative to the housing, and back to its original position. The first channel section 84 and draining port 148 are moved out of fluid communication with each other, FIG. 3. The air hole 110 and the second channel section 146 are moved out of fluid communication with each other. The draining port 148 and the second channel section 146 is moved outside of the O-ring 96. The operator knows the valve arrangement 80 is in the closed position, because he feels the tactile "click" of the column 112 move past the protrusion 180 and the column 112 abut the stop surface 176 of the groove 118.

As is apparent, no threads are required to compress a seal. That is, several turns of one structure relative to another in order to convert rotational movement to linear movement and gradually move the one structure away from the other, is not required. The seal is formed through the sliding engagement between the collar and the valve stem. The seal does not require a pre-set amount of torque transmission from a threaded fastener, as with prior arrangements. The twist lock open and close of the valve arrangement with a one-half turn prevents over torquing, and avoids problems with conventional arrangements. Further, the valve arrangement is more resistant to vibration and pressure impulses than the prior art arrangements. The valve arrangement can be activated quickly, so as to minimize operator contact with the valve and hazardous fluids within the filter.

The valve arrangement 80 is illustrated in the preferred embodiments as being used on a fluid filter. The valve arrangement 80 may also be used to drain any fluid-holding tanks, such as fuel storage tanks. However, using the valve arrangement 80 with a fluid filter is convenient and preferred.

Figure 14:
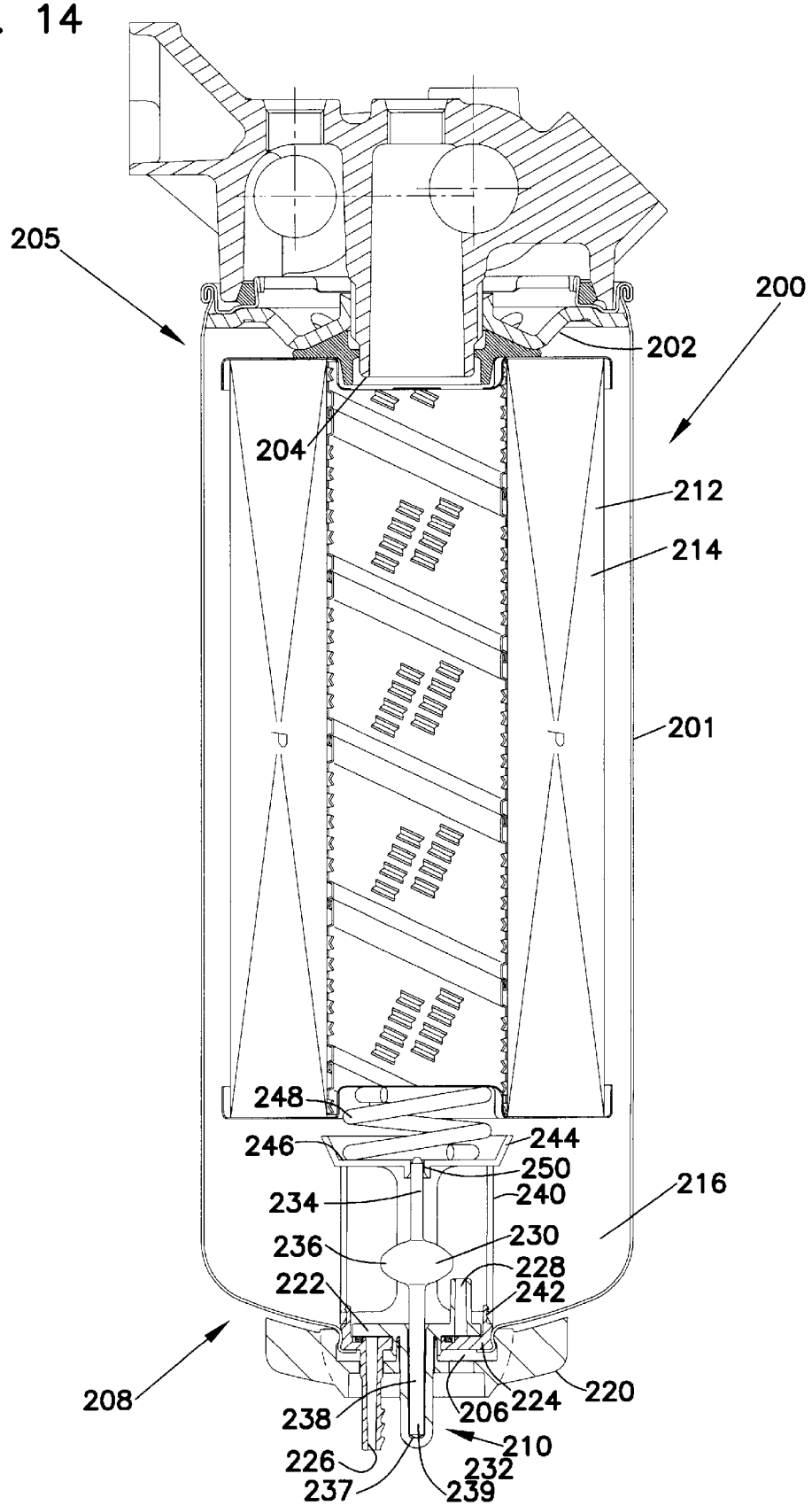
FIG. 14 is a partially schematic, cross-sectional view of a second embodiment of a fluid filter, with a visual indicator arrangement indicating little or no fluid in the housing, according to the present invention.
Figure 15:
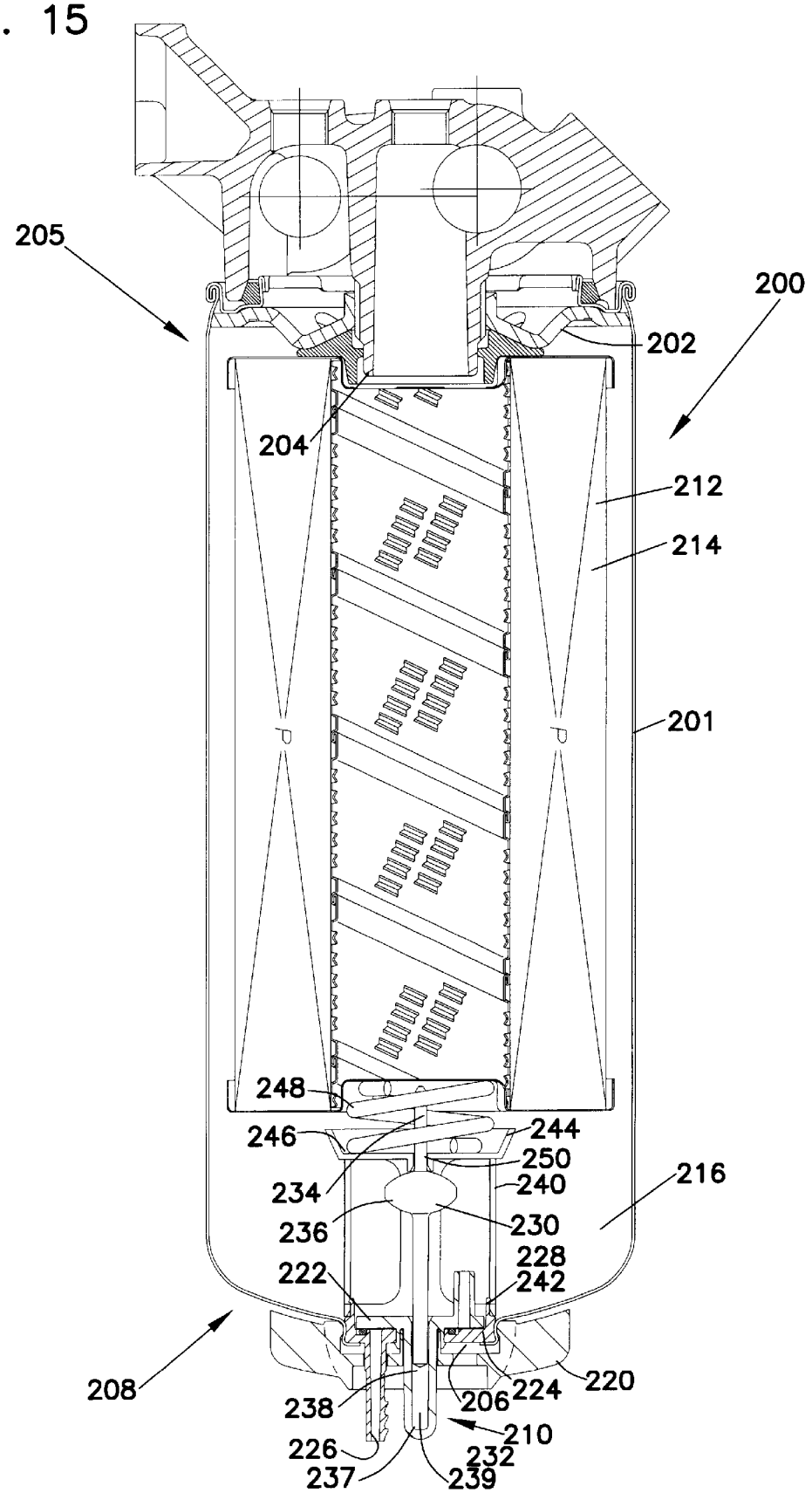
FIG. 15 is a partially schematic, cross-sectional view of the arrangement shown in FIG. 14, with the indicator arrangement indicating fluid collection in the housing, according to the present invention.

A second embodiment of a filter arrangement is illustrated in FIGS. 14 and 15 generally at 200. The filter arrangement 200 may be generally constructed analogously to the filter arrangement 20 of FIG. 1. Filter arrangement 200 includes an inlet 202, an outlet 204 and a drain aperture 206. A valve arrangement is provided at 208 for allowing the drainage of fluid, such as water, from the filter arrangement 200. A fluid level indicator is provided generally at 210 for providing the operator with information as to the level of water in the housing.

The filter arrangement 200 includes a filter element 212 having media 214. The filter media 214 will depend upon, of course, what type of fluid is being filtered. To separate a mixture of fluids, such as water from fuel, the media may be coated with a hydrophobic coating on the filter media 214.

The valve arrangement 208 includes a control knob 220, a valve stem 222 secured to the knob 220 and a collar 224 secured to the housing 201. The valve arrangement 208 is analogous to the valve arrangement described above with respect to FIGS. 1–13. Other types of valve arrangements may be usable with the FIG. 14 embodiment. The collar 224 defines a first port or channel section 226, and an air hole. The valve stem 222 defines a second channel section 228 and draining port. The valve arrangement 208 is movable between a closed position where the first channel section 226 and draining port are not aligned, FIG. 14, to an open position where the first channel section 226 and draining port are aligned. In the closed position, the air hole and second channel section 228 are not aligned. In the open position, the air hole and second channel section 228 are aligned and in fluid communication.

A reservoir 216 is at a region of the filter housing 201 which, when oriented in the direction shown in FIG. 14, corresponds to the bottom of the housing 201. Separated fluid, such as water, collects in the region of the reservoir 216. In order to provide an operator with information as to when it is appropriate to drain the filter housing 201, a fluid level indicator arrangement 210 is provided.

The fluid level indicator 210 gives the operator information about when the level of the separated fluid collected in the reservoir 216 reaches a level appropriate for draining the fluid. In particular, the fluid level indicator provides a visual signal when the level of the first fluid, for example water, has reached a predetermined level.

In the particular embodiment illustrated in FIGS. 14 and 15, the indicator arrangement 210 includes a float 230 and a window 232. The float 230 is made of a material having a density sufficient to float in the separated material collected at the reservoir region 216 and float in the second fluid. For example, if used in a fuel/water separator, the float 230 has a density which is less than water, in order to allow it to float in water. The float 230 has a density greater than the density of organic material, such as diesel fuel. One preferred material for the float 230 is molded plastic having a density (specific gravity) of 0.9 to about 0.95.

The float 230 includes a first elongated region 234 defining one end thereof; a middle bulbous-shaped portion 236; and a second elongated region 238 defining a second end thereof. The float 230 is held within the filter housing 201 and in the indicator arrangement 210 by means of a cage 240. Cage 240 is generally cylindrical in shape and is secured to the collar 224 by hook members 242, which are integral with the collar 224. The cage is preferably constructed from glass-filed nylon. An upper portion of the cage 244 defines a seat 246 for holding a spring 248. The spring 248 biases the filter element 212 against the first end 205 of the filter arrangement 200. The upper portion 244 of the cage 240 defines an opening 250. Opening 250 is for slidably accommodating the first elongated region 234 of the float 230. This also helps to hold the float 230 within the window 232.

As the float 230 rises within the cage 240, that is as the water level increases, the first elongated region 234 slides within and up through the opening 250. The elongated region 238 slides within the window 232, FIG. 15.

Preferably, the float 230 has a dark exterior color, such as black. This helps to emphasize the visual indication of the water level through the window.

The window 232 is preferably part of the valve stem 222. The window 232 is a tube-shaped member, preferably constructed from a clear material. As such, the float 230 will be visible through the window 232, when the float 230 is in the region of the window 232.

In operation, when the filter arrangement 200 has no water in the reservoir 216, or a level of water which is below the level of the bulbous-shaped portion 236, the end 237 of the float 230 is abutting the inner end 239 of the window 232. The elongated region 238 of the float 230 is visible through the window 232. That is, the dark color of the float at the region 238 is readily apparent through the clear window 232. If reservoir 216 is filled with organic material, such as fuel, the density of the float 230 is greater than the density of the fuel, so the float stays in the position shown in FIG. 14.

During the filtering process, water is separated from a fuel/water mixture, and the water settles to the bottom of the filter 200 in the reservoir 216. When the water level reaches the bulbous portion 236, the float 230 starts to rise and float in the water, as the water level rises. This causes the elongated region 234 to move up through the opening 250, and the elongated region 238 to rise through the window 232.

Eventually, the water level will become high enough that the elongated region 238 will no longer be visible through the window 232. The bulbous region 236 will abut the opening 250 of the cage 240, and the float will be precluded from rising any higher. This is illustrated in FIG. 15. When the float 230 is no longer visible through the window 232, this provides a visual signal to the operator that it is time to drain the filter arrangement 200. That is, the appearance of indicator 210 changes from dark to light, in the illustrated example.

The operator then moves the valve arrangement 208 from the closed position to the open position. For example, the knob 220 is rotated one-half turn, and the first channel section 226 and draining port are aligned. The water drains through the first channel section 226 and draining port. As the water drains, the float 230 sinks back down to a position where the end 237 is abutting the inner end 239 of the window 232. The operator may then move the valve arrangement 208 to the closed position, illustrated in FIG. 14.

As is apparent, the vertical motion of the float 230 is limited so that the shaft-like elongated region 234 cannot become disengaged from the inside diameter of the tubular window 232. This also facilitates easy handling as a subassembly during manufacturing. The optical effect of the float within the window is enhanced by the color contrast between the dark appearance when the filter does not need to be drained, and the light or clear appearance hen the filter arrangement 200 does need to be drained.

Preferably, the indicator 210 is replaced each time the filter arrangement 200 is serviced. This will ensure that the window 232 remains clear and visible therethrough.

The valve arrangement 208 and fluid level indicator arrangement 210 are illustrated in the preferred embodiments as being used on a fluid filter. The valve arrangement 208 and fluid level indicator 210 may also be used to with any fluid-holding tank, such as fuel storage tanks. However, a fluid filter is convenient and preferred.

Further, although the fluid level indicator arrangement 210 is illustrated as being used with the valve arrangement 208, other embodiments include the use of the fluid level indicator arrangement 210 without the valve arrangement. In such embodiments, the structure defining the window is secured to the fluid tank, or fluid filter. However, the illustrated embodiment is convenient and preferred.

III. Sample Specifications

In this section, an example is provided of a set of operating materials and specifications. These are intended as an example. A wide variety of alternate materials and sizes can be used.

The specific example is for use as a fuel filter and water separator. Such systems typically filter diesel fuel at a rate of about 3 gal/hr.

The housing is constructed from steel. The housing has an outer diameter of about 3.7 inches, and a length of about 8 inches. The outlet tube has an average inner diameter of about 1 inch.

The filter media 46 includes a media made from cellulose. This media has an efficiency of about 5 microns, and a typical life of about 300 hours. Installed in the arrangement shown in FIG. 1, the media has an outside diameter of about 3.2 inches, and an inside diameter of about 1.7 inches.

End caps on the filter element 32 are constructed from steel. The first end cap 40 has an outer diameter of about 3.3 inches, and an inner diameter of about 1.5 inches. The second end cap 44 has an outer diameter of about 3.3 inches.

The axial seal 68 includes a resting, non-compressed diameter of about 1.8 inches, an outside thickness, that is the thickness across the end not extending into the interior of the filter media, of about 0.1 inches, and an inside thickness, that is the thickness extending into the interior of the filter element 32, of about 0.3 inches.

Spring 47 is a coil with about 5 coils. In an uncompressed state, spring 47 has a length of about 2.2 inches, a diameter of about 1.5 inches, and is constructed from steel. Spring 47 has a constant of about 160.

Drainage aperture 31 at the closed end of the housing 26 has a diameter of about 1.2 inches.

The collar 82 is constructed from zinc. It includes a main outer diameter across its widest portion of about 1.5 inches. The outer rim 86 is on a radius of about 0.02 inches. The arc length of the rim 86 is about 40°. The inner recessed portion 88 has a diameter of about 1.25 inches. The receiving groove 94 has an outer diameter of about 1.0 inch and an inner diameter of about 0.8 inch. The height of the groove 94 is about 0.05 inches. The aperture 104 includes a diameter of about 0.5 inches. The thickness of the cylindrical wall 108 extending between the bottom surface 114 and the recessed portion 88 is about 0.13 inches. The column 112 has a length from the bottom portion 114 to its tip of about 0.5 inches. The column 112 includes an outer diameter of about 0.2 inches, and an inner diameter of about 0.1 inches. It is angled about 5° relative to the bottom surface 114 of the collar 82. The hole 110 has a diameter of about 0.1 inches. The O-ring sealing gasket in the collar 82 includes an outer diameter of about 0.95 inches, and an inner diameter of about 0.8 inches. It has a resting, non-compressed thickness of about 0.07 inches. It is constructed from rubber.

The valve stem 98 is constructed from nylon. It includes an outer diameter of about 1.25 inches. The thickness between surface 124 and surface 126 is about 0.12 inches. The length of the column 140 between surface 126 and the end tip is about 0.4 inches. The column 140 has an outer diameter of about 0.2 inches and an inner diameter of about 0.1 inches. The column 140 extends at an angle of about 5° relative to the surface 126. The flanged ring 106 includes 8 number of flange members 130. The outside diameter of flanged ring 106 is about 0.5 inches, and the inside diameter of flanged ring is about 0.4 inches. Each of the flange members have a length from surface 124 to the very tip of about 0.2 inches. The arc distance between adjacent flange members 130 is about 45°. The camming surface 134 is angled at about 60° from the horizontal. The hole 148 has a diameter of about 0.1 inches.

The control knob 120 is constructed from nylon. The distance between the end tip of flange 152 and the end tip of flange 154 is about 3 inches. The diameter of the knob is about 2 inches. The knob includes 8 number of projecting tongues 166. The tongues have a length from bottom wall 158 to their end tip of about 0.3 inches. The rounded heads 170 are on a radius of about 0.1 inches. The flat portion 168 has a length from bottom wall 158 to the portion where rounded heads 170 begin of about 0.12 inches. The tongues 166 have a thickness of about 0.07 inches in the region of flat portion 168. The outside diameter formed by the ring of tongues 166 is about 1.8 inches, and the inside diameter is about 1.5 inches. The arc distance between adjacent tongues is about 45°.

The hub 156 of the knob 120 has an outside diameter of about 0.45 inches, and an inside diameter of about 0.35 inches. The hub 156 includes about 8 number of spokes. Each of the spokes extend a length of about 0.25 inches from the bottom surface 158 to their very tip. The arc distance between adjacent spokes is about 45°. The length of the cylindrical wall 157 of the hub 156 is about 0.35 inches. The groove 118 is on an outside radius of about 0.5–0.6 inches (typically, 0.56 inches) and an inside radius of about 0.3–0.4 inches (typically, about 0.32 inches). It extends between stop surface 176 and stop surface 178 over an angle of about 200°. The width of the groove 118 is about 0.2–0.3 inches (typically, about 0.24 inches). The stop surfaces 176 and 178 are each on a radius of about 0.1–0.2 inches (typically, about 0.12 inches). The projection 180 is on a radius of about 0.04 inches. It extends about 0.02 inches distance into the groove 118. The diameter of the rim 186 of the second cavity 153 is about 1.3 inches.

The float 230 is constructed from molded plastic. This has a density of about 0.90 to 0.95. The first elongated region 234 of the float 230 has a diameter of about 0.10" and a length between its tip to the middle bulbous portion of about 0.80". The middle portion is shaped like an oblate spheroid, with a truncated portion at the equator. The portions between the truncated portion of the equator is on a radius of about 0.47 inches. The second elongated region 238 has a diameter of about 0.14 inches and a length from the middle portion 236 of the float down to the end tip of about 1.5 inches. The overall length of the float from end to end is about 2.8 inches. The float 230 is black in color.

The window 232 is constructed from plastic. The length of the window 232 is about 1.1 inches. It has an end tip on a radius of about 0.16 inches.

The cage 240 is constructed from glass-filled nylon. It has an outside diameter of about 1.5 inches and an overall length of about 1.9 inches. The opening 250 has a diameter of about 0.12 inches. The distance between a bottom surface and top surface between which the float travels from its position in FIG. 14 to its position in FIG. 15 is about 1.3 inches.

The arrangement would be assembled as follows: the O-ring 96 is placed into groove 94. A bead of adhesive is applied circumferentially to surface 86. The collar 82 is pressed into the housing. A roller which has the same profile as surface 86 forms a bead in the housing which corresponds to surface 86. This secures the collar to the housing. The valve stem 98 is pressed into the collar. The knob 120 is aligned and pressed onto the valve assembly.

Since many embodiments of the invention can be made without departing from the spirit and scope of the invention, the invention resides in the claims hereinafter appended.

We claim:

1. A valve arrangement associated with a fluid tank for permitting selective passage of fluid therefrom, the valve arrangement comprising:
   (a) a collar arrangement defining a first open channel section, and having an O-ring seal member;
      (i) said O-ring seal member defining a closed perimeter;
   (b) a stem arrangement defining a draining port; said stem arrangement being slidably secured to said collar arrangement for relative eccentric slidable movement with said O-ring seal member; said eccentric movement being between first and second positions;
      (i) said draining port being within said O-ring seal member perimeter when in said first position; and said first open channel section and draining port being aligned when in said first position; and
      (ii) said draining port being outside of said O-ring seal member perimeter when in said second position; and said first channel section and draining port being out of alignment when in said second position.

2. A valve arrangement according to claim 1, further including:
   (a) a control member secured to said stem arrangement to move said stem arrangement between said first and second positions.

3. A valve arrangement according to claim 2, wherein:
   (a) said control member includes a pair of stops to provide a tactile indication of said first and second positions.

4. A valve arrangement according to claim 1, wherein:
   (a) said stem arrangement includes a clear window constructed and arranged to accommodate a float member to provide a visual indication of fluid level, when said valve arrangement is mounted to the fluid tank.

5. A valve arrangement according to claim 1, wherein:
   (a) said collar arrangement includes an outer rim; said outer rim having threads to permit said collar arrangement to be fastened to a threaded fluid tank.

6. A valve arrangement comprising:
   (a) a collar defining a first channel section;
   (b) a valve stem defining a draining port;
      (i) said valve stem being movable relative to said collar between: an open position, where said first channel section and draining port are aligned; and a closed position, where said first channel section and draining port are not aligned;
      (ii) said valve stem having a clear window;
   (c) a sealing gasket seated within said collar including a periphery circumscribing said first channel section;
      (i) said valve stem being constructed and arranged to permit said draining port to be movable within and outside of said periphery of said sealing gasket; and
   (d) a float oriented in said clear window of said valve stem to provide a visual indication of fluid level, when the valve arrangement is mounted on a fluid tank.

7. A valve arrangement according to claim 6 further comprising:
   (a) a knob secured to said valve stem to move said valve stem between said open and closed positions.

8. A valve arrangement according to claim 7 wherein:
   (a) said knob includes a pair of stops to provide a tactile indication for when said valve arrangement is either in said open position or said closed position.

9. A valve arrangement according to claim 6 wherein:
   (a) said sealing gasket comprises an O-ring.

10. A valve arrangement according to claim 6 wherein:
    (a) said collar includes an outer rim; said outer rim having threads to permit said collar to be fastened to a threaded fluid tank.

* * * * *